INVENTORS
WILLIAM H. BARKOW &
DANIEL BRASEN

United States Patent Office

3,447,853
Patented June 3, 1969

3,447,853
LIGHT DEFLECTING APPARATUS
William Henry Barkow, Pennsauken, and Daniel Brasen, Hightstown, N.J., assignors to Radio Corporation of America, a corporation of Delaware
Filed July 30, 1965, Ser. No. 476,000
Int. Cl. G02b 17/06
U.S. Cl. 350—7        8 Claims

ABSTRACT OF THE DISCLOSURE

Apparatus in which a first lens collects a deflected beam of light and focuses it to a diffraction limited spot and in which a second lens is positioned where the first lens reduces the deflection substantially to zero for focusing the diffraction limited spot to a reduced size.

---

This invention relates to light deflecting apparatus and, more particularly, to such apparatus for use in high resolution micro-image scanning systems.

One system for scanning a line with a diffraction limited spot of light is shown in the prior art drawing of FIGURE 1. A light source 110 supplies a parallel beam of light 120, of a diameter equal to $2a$. The beam strikes a spherical mirror 130, and is focused to a diffraction limited spot of light, which represents the minimum spot size obtainable, at point A on its focal plane 140, a focal length distance $f$ away. The diameter of this spot, measured to the center of the first dark ring of the resulting diffraction pattern, is given by the expression $$d = \frac{1.22\lambda}{\sin \alpha}$$

where $\lambda$ represents the wavelength of the incident light and $\sin \alpha$ can be approximated by the fraction $a/f$. As the mirror 130 is rotated through an angle $\phi$ by a driving source (not shown, the diffraction limited spot is made to scan a length of line, $l$, along the focal plane 140. Assuming that the rotation of the mirror 130 from its quiescent condition is such that the angular displacement of the reflected beam is the same on either side of its initial position (indicated by the angle $\gamma$ in FIGURE 1), then the length of the line scanned, $l$, equals $2f \tan \phi/2$. The number of beam diameters in the line is therefore equal to $$\frac{2a \tan \phi/2}{1.22\lambda}$$

As is readily apparent, this beam diameter resolution, $l/d$, is independent of the focal length, $f$, of the spherical mirror 130.

Such a system as that just described is not generally suitable for use in line micro-scanning operations where high resolution—such as that existing in present day television broadcast practice—is required. It can be shown, for example, that in order to scan a micro-image one millimeter on a side with a 2 micron diameter spot of light—so as to obtain a resolution of 500 beam diameters—a spherical mirror having a focal length of .13 inch would be required if the incident beam of light were supplied from a helium-neon gas laser of 6,328 A. wavelength and of a diameter equal to .1 inch. Such a short focal length mirror is not easily obtainable using today's manufacturing techniques, however. And it is that fact, therefore, which militates against using this sort of arrangement in the micro-image scanning environment. But even if such a mirror could be obtained on a commercial basis, the placing of the micro-image to be scanned at the focal length of the mirror, only .13 inch away from its reflecting surface, would undesirably block a significant portion of the supplied light from ever reaching the mirror to begin with.

A second conventional system for scanning a line with a diffraction limited spot uses a rotating plane mirror to deflect the beam and a distant lens to focus it to a spot. But this arrangement, also, is not suitable for micro-image scanning usage; a .13 inch focal length would still be required for the lens, which in addition, would have to have an F number several times smaller than unity if it were to be sufficiently large in diameter to gather in substantially all the light deflected by the mirror. As almost goes without saying, the expense of manufacturing such a lens would more than offset any benefits which might be derived by using it in such an image scanning environment. Although more practical F number lenses could be used by decreasing the lens diameter and by moving the lens in closer to the mirror at the same time, so as to maintain the amount of deflected light gathered in by it constant, such inward movement may also cause an interference with the light directed from the source to the mirror.

It is an object to the invention, therefore, to provide light deflecting apparatus for use in high resolution micro-image scanning systems, which avoids the above-mentioned limitations and disadvantages of prior such apparatus.

As will become clear hereinafter, light deflecting apparatus constructed in accordance with the principles and teachings of the present invention include a rotating light reflective surface and a pair of co-acting lenses, the first of which is primarily concerned with collecting a deflected beam of light while the second is primarily concerned with focusing the deflected beam to a spot size suitable for purposes of high resolution micro-image scanning.

For a better understanding of the present invention, together with further objects thereof, reference is had to the following description taken in connection with the accompanying drawings, and its scope will be pointed out in the appended claims.

Figure 2:
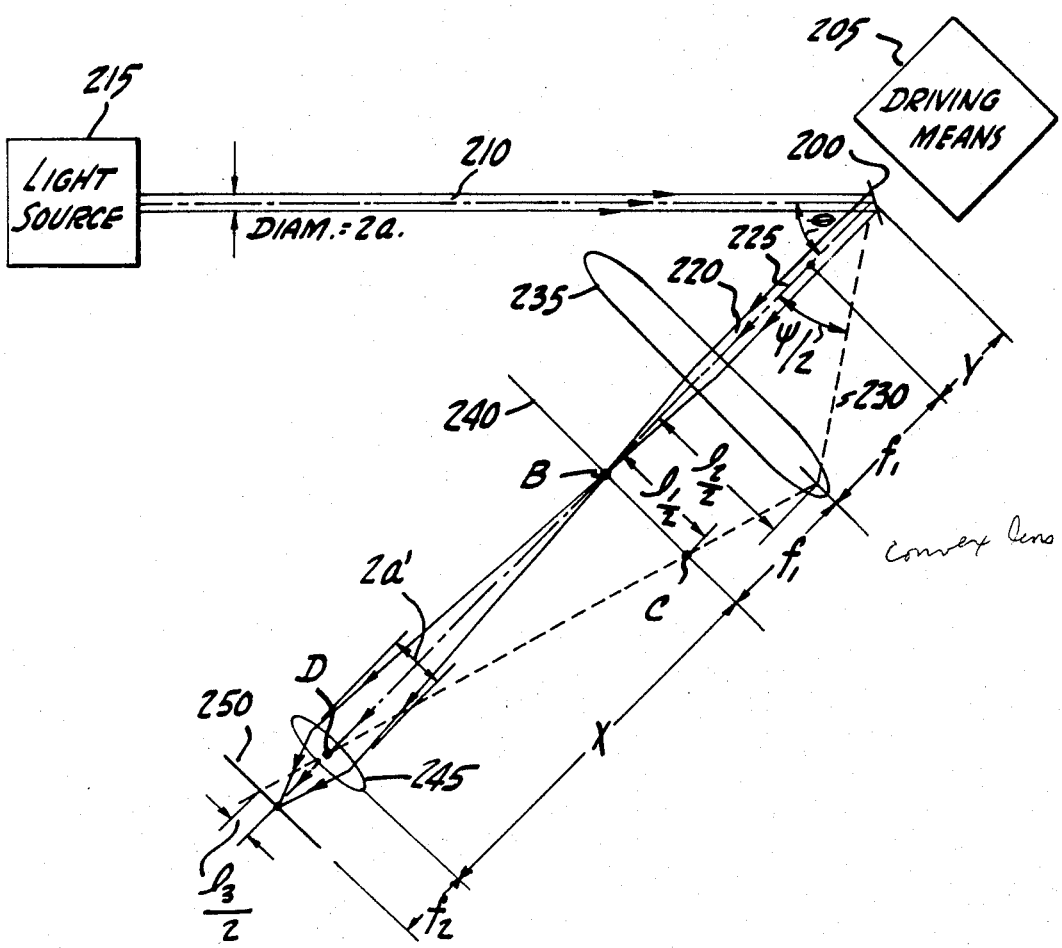
FIGURE 2 represents one form of light deflecting apparatus constructed according to the invention.

*Description and operation of the light deflecting apparatus of FIGURE 2*

Referring now more particularly to FIGURE 2 of the drawings, that figure illustrates how the light deflecting apparatus of the present invention might be used in line-micro-scanning. The apparatus shown includes a light reflective surface 200 and, also, driving means 205 for rotating that surface. Such a combination may comprise the well known electro-mechanical or d'Arsonval galvanometer type arrangement of using a mirror coupled to a coil suspended between the poles of a U-shaped magnet. Alternatively, it may comprise a tuning fork device, with appropriate reflecting accessories attached to the tines of the fork. Where high speed scanning is an additional system requirement, the use of any one of the torsional arrangements described in pending application, Ser. No. 473,329, filed July 20, 1965, and entitled, "Torsional Light Deflector," for this combination provides highly satisfactory results.

The light deflecting apparatus also includes means for directing a beam of light and, more particularly, a parallel beam of light 210, towards the light reflective surface 200 (hereafter referred to as the plane mirror 200, or simply as the mirror 200). Such means may comprise a laser or any source of collimated light 215. In one form of this embodiment, a helium-neon gas laser having a power output of 100 microwatts, single mode, at a wavelength of 6,328 A. was used as the light source 215. The diameter of the light beam 210 supplied by this gas laser, indicated as $2a$ in FIGURE 2, is of the order of .1 inch.

Assuming that the initial position of the plane mirror 200 is as shown in FIGURE 2, then the parallel beam of light 210 supplied by the source 215 will be reflected by the mirror 200 at an angle equal to $\theta$, and will appear as indicated by the beam 220. Let it now be assumed that the driving means 205—the electro-mechanical arrangement, the tuning fork arrangement, or the torsional arrangement, for example—rotates the mirror 200 through an angle $\psi/2$ on either side of its initial position. This rotation causes the light beam 220 to be deflected through an equal angular displacement from its initial or rest position, clockwise and counter-clockwise alike. For simplicity of FIGURE 2 of the drawings—and also for simplicity of FIGURE 3, a description of which follows subsequently—only angular displacements on one side are shown. In addition, only the central ray of the deflected beam is shown and for the same reason. Thus, the central ray 225 of the beam 220 when deflected by an amount $\psi/2$, is shown in its new position by the dashed line 230. As will be noted, it is an angle $\theta+\psi/2$ away from the central ray of the beam 210 as supplied by the source 215.

The light deflecting apparatus of this embodiment of the invention additionally includes a first lens 235 for reducing the linear deflection provided by any of the above-mentioned rotating arrangements and for focusing the deflected beam (as represented by the central ray 230) to a diffraction limited spot of light. This lens 235 is a thin lens of the convex variety and is positioned a distance Y plus its focal length $f_1$ away from the mirror 200 as shown. The lens 235, in addition, is so arranged that the central ray of the reflected light beam 225, with mirror 200 in the initial position, passes through its optical axis. With such an arrangement, each deflected light beam is focused to a diffraction limited spot on the focal plane 240 of the lens 235, a focal length distance $f_1$ behind the lens 235—at point B for the reflected beam 220 at point C for the deflected beam indicated by the ray 230. The micro-image to be scanned is, as will become presently clear, not located at this focal plane 240, however, as contra-distinct from the second type of prior art scanning system described previously. The diameter of this diffraction limited spot, therefore, may be many times larger than the size necessary for purposes of micro-scanning. This, in turn, permits a wide variety of focal length lenses to be used for the lens 235, all other things remaining equal. By adjusting the distance Y so that a reasonable lens diameter may be selected to gather in the deflected light, practical F number lenses may be used in the configuration. In the form of this embodiment alluded to above a 1.79 inch focal length F1.5 16 mm. camera lens was used as the lens 235.

The diameter of the diffraction limited spot focused onto the focal plane 240—either at the points B or C or at any other point thereon—can be determined, once again, from the general expression $$d = \frac{1.22\lambda}{\sin \alpha}$$

With a 6,328 A. wavelength incident beam of .1 inch diameter light and with a 1.79 inch focal length lens, the diameter of this spot can be calculated to be 27.7 microns. Such a spot size is obviously too large to provide any resolution approximating that existent in present day television practice when used to scan a micro-image 1 millimeter on a side when that micro-image is placed at $$\left(\frac{l}{d} = 36.1 \text{ beam diameters}\right)$$

the focal plane 240

The light deflecting apparatus of FIGURE 2 further includes a second lens 245 for focusing the diffraction limited spot produced on the focal plane 240 down to a diminished size suitable for high resolution micro-image scanning. This lens 245 is positioned a distance X plus the focal length $f_1$ of the lens 235 away from that lens. More particularly, the lens 245 is positioned at that point where the lens 235 effectively reduces the linear deflection provided by the mirror rotating arrangements to zero. With such a configuration, the image of the center of the mirror 200 falls substantially on the lens 245. While the invention operates best when the lens 245 is placed precisely where the resulting deflection is zero (point D on the central ray 225), highly satisfactory results are still obtained with the lens 245 placed slightly ahead of that point or slightly behind it. For best results, the lens 245 is so arranged that the ray 225 also passes through its optical axis. In the embodiment of the invention referred to above, a microscope objective with a focal length of 8 millimeters and with a numerical aperture of .5 was used as the lens 245. An equivalent numerical aperture F1.1 camera lens may similarly be used for the lens 245.

As was previously mentioned, this lens 245 is primarily concerned with focusing the deflected beam to a spot size suitable for purposes of high resolution micro-image scanning. This spot size is given by the expression $$d_2 = \frac{1.22\lambda f_2}{a'}$$

where $f_2$ represents the focal length of the lens 245; $\lambda$ represents, once again, the wavelength of the incident light; and $a'$ represents the radius of the light beam at the lens 245. The expression for $a'$ can be determined from the following mathematical proof.

From simple geometry, it is seen that $$\frac{a'}{a} = \frac{X}{f_1} \quad (1)$$

Substituting the Newtonian form of the thin lens equation $$XY = f_1^2 \quad (2)$$

(See Principles and Applications of Physics—O. Bluh and J. Elder, Interscience Publishers, New York, 1955, p. 390) into the expression (1), it can be shown that $$a' = \frac{af_1}{Y} \quad (3)$$

The diameter of the diffraction limited spot at the focal plane 250 of the lens 245 is therefore given by the expression $$d_2 = \frac{1.22\lambda f_2 Y}{af_1}$$

With a 6,328 A. wavelength light beam of .1 inch diameter, a first lens 235 of a 1.79 inch focal length, a second lens 245 of an 8 millimeter focal length—.5 numerical aperture, and a lens separation of 27 centimeters the diameter of this spot can be shown to be approximately 1.8 microns. With the micro-image position at the focal plane 250 and with such an arrangement, more than 500 beam diameters resolution can be obtained when the spot is made to scan the entire one millimeter length of the micro-image.

It will now be shown that this resolution is identical to that obtained with the prior art focusing arrangement described above. It will be remembered that that resolution was said to be equal to $$\frac{2a \tan \phi/2}{1.22\lambda}$$

Referring to FIGURE 2:

$$\frac{l_{1/2}}{l_{2/2}} = \frac{X}{X + f_1} \quad (4)$$

But $$l_2/2 = (Y+f_1) \tan \psi/2 \qquad (5)$$

and $$XY = f_1^2 \qquad (2)$$

Substituting (2) and (5) into (4) and cross-multiplying:

$$\frac{l_1}{2} = \frac{(f_1^2 + Xf_1) \tan \psi/2}{X+f_1}$$

or $$\frac{l_1}{2} = f_1 \tan \psi/2 \qquad (6)$$

However, $$\frac{l_{3/2}}{l_{1/2}} = \frac{f_2}{X} \qquad (7)$$

Substituting (2) and (6) into (7) and cross-multiplying:

$$\frac{l_3}{2} = \frac{f_1 f_2 Y \tan \psi/2}{f_1^2}$$

or $$\frac{l_3}{2} = \frac{f_2 Y \tan \psi/2}{f_1} \qquad (8)$$

Since $l_3/2$ represents the linear displacement on one side of the optical axis only, the total displacement, i.e., the length of the line scanned, $l_3$, at the focal plane 250, is given by two times the expression (8). The number of beam diameters in the scanned line $l_3$ is therefore equal to:

$$\frac{l_3}{d_2} = \left(\frac{2f_2 Y \tan \psi/2}{f_1}\right)\left(\frac{af_1}{1.22\lambda f_2 Y}\right)$$

or $$\frac{l_3}{d_2} = \frac{2a \tan \psi/2}{1.22\lambda} \qquad (9)$$

Figure 1:
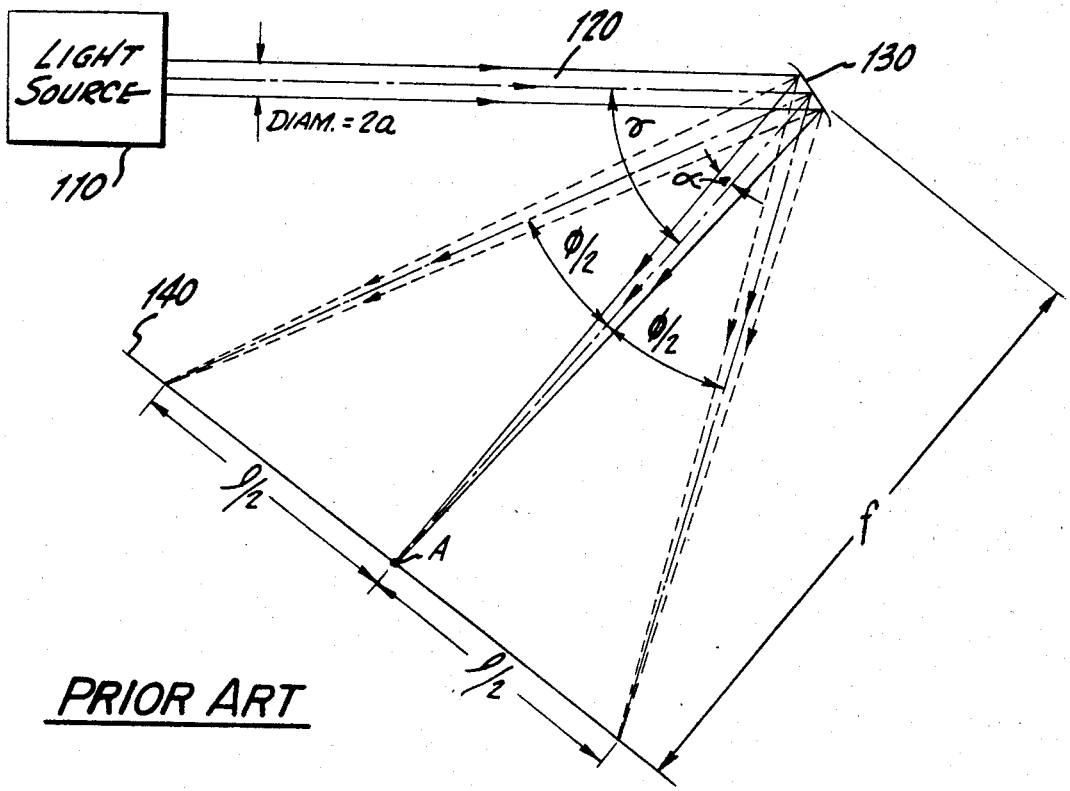
FIGURE 1 represents the prior art system of scanning a line with a diffraction limited spot of light as was referred to above.

Thus, by providing equal angular rotations to the respective reflecting mirrors ($\phi$ in FIGURE 1 and $\psi$ in FIGURE 2), equal beam diameter resolution is obtainable with either configuration. The arrangement shown in FIGURE 2, however, permits reasonable, and therefore economically practical, lenses to be used in an arrangement wherein all of the light supplied by the source reaches the reflecting mirror.

It is to be noted in passing that this same beam diameter resolution also exists at the focal plane 240 of the lens 235, where the length of the scanned line $$l_1 = 2f_1 \tan \psi/2$$

and the diameter of the diffraction limited spot $$d_1 = \frac{1.22\lambda f_1}{a}$$

The significance of this fact will become clear when the reader considers the information writing applications of the invention described below.

Figure 3:
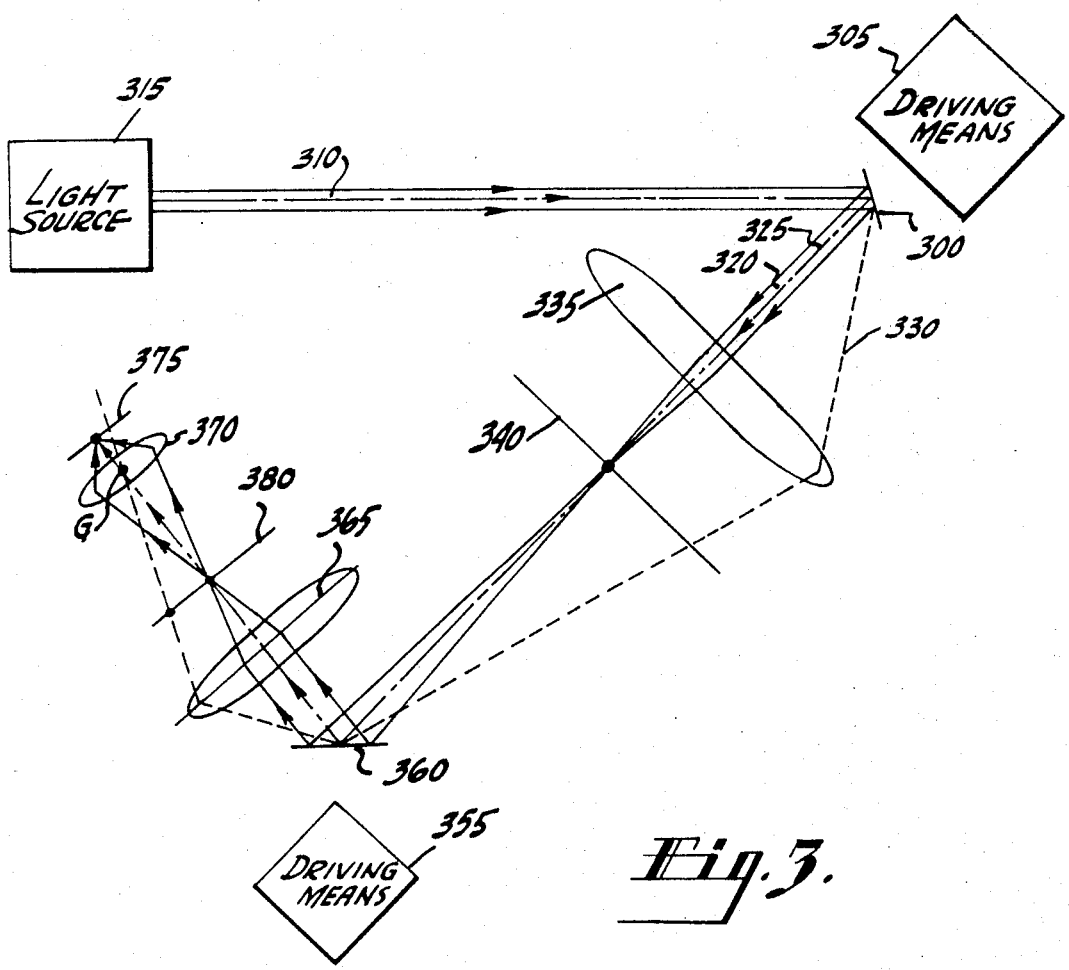
FIGURE 3 represents a modified form of light deflecting apparatus in accordance with the invention.

*Description and operation of the light deflecting apparatus of FIGURE 3*

The light deflecting apparatus just described and shown in FIGURE 2 essentially represents a line micro-scanner. The light deflecting apparatus shown in FIGURE 3, on the other hand, represents a raster micro-scanner, in which corresponding components carry the same reference numerals as in FIGURE 2, except preceded by the numeral 3.

Referring to FIGURE 3, a light reflector 360 and driving rotational means 355 are inserted in place of the lens 245 of FIGURE 2. The axis of rotation for this reflector 360 is arranged to be perpendicular to the axis of rotation for the mirror 300. The mirror 300 can be aligned to scan in a horizontal direction, for example, while the reflector 360 can be aligned to scan in a vertical direction. The rotational combination 355, 360 may also be of the electro-mechanical, tuning fork, or torsional type, just as in the apparatus of FIGURE 2.

Since the center of the mirror 300 is imaged at the position where the reflector 360 is placed, and since the reflector 360 is so arranged that the central ray from the lens 335 passes through its center, both the deflection centers of the mirror 300 and the reflector 360 will be superimposed. The vertical deflection provided by the reflector 360 will then also be superimposed on the horizontal deflection provided by the mirror 300, to form a scanned raster. The scanning spot of light is then focused by a second lens 365, which performs a function similar to that provided by the lens 335 of FIGURE 2; namely, to reduce the overall linear deflection. At the point of zero deflection G, a third lens 370 is inserted to focus the scanning spot to a size suitable for high resolution micro-scanning purposes. This lens 370 therefore performs a function similar to that provided by the lens 245 of FIGURE 2. The scanned raster will then have at its focal plane 375 approximately the same resolution as the raster will have at the focal plane 380 of the lens 365, just as the resolution of the scanning line at the focal plane 250 of the lens 245 in FIGURE 2 equalled that at the focal plane 240 of the lens 235.

Such light deflecting apparatus as is constructed according to the present invention can be extremely effective in the reading of high density information from a micro-image surface. When used as a reading device, it is desirable to include a photo-multiplier pickup tube in the scanning system to convert the light modulated by the micro-image pattern into an electrical signal.

The light deflecting apparatus is perhaps more useful as a writing device, for writing micro-image information onto a surface. When using a laser as the light source, the power density of the focused spot with this arrangement can be made extremely high—a one milliwatt laser beam focused down to a two micron spot, for example, will have a power density of approximately 15 kilowatts per square centimeter when the light transmission through the optical system is only 50%. The micro-image information may be laid down on the surface by modulating the laser beam with electro-optical means or by scanning the beam through a pattern placed at one of the intermediate focal planes—at 380 in FIGURE 3, for example. By placing patterns at more than one focal plane and/or by modulating the beam with an electro-optical modulator, a number of multiple signals can be added together to form the final image on the final focal plane.

Other applications for the light deflecting apparatus will also be apparent. In one example, by using four deflectors in an arrangement similar to the two deflector arrangement of FIGURE 3, a system can be developed for scanning a micro-image situated within a larger image area at the same time that the larger image area is scanned. These two scannings can be carried out at the same or different rates, whichever is desired. In another example, by placing the lens 370 of FIGURE 3 either before or after the point of zero deflection, G, a fixed amount of offset can be established between the deflection centers of the mirror 300 and the reflector 360. Such offset is desirable when the light deflecting apparatus is employed in the printing of shadow-mask screens for color kinescopes, another one of its many uses.

With a high energy laser beam as the light source, the deflecting apparatus of the present invention can additionally be used in milling and welding operations, as well as in other machine shop applications. With the advent of higher energy lasers than are presently commercially available, deflection apparatus using such lasers and constructed according to the invention can, furthermore, prove attractive in large screen, bright display type image presentation systems.

While the present invention has been described as it would be used in a micro-scanning environment, it will be obvious to those skilled in the art that its teachings are applicable wherever it is desired to scan a line or an area with a spot of light whose diameter is less than that of an incident light beam.

What is claimed is:
1. Light deflecting apparatus comprising:
a light reflective surface;
first means for directing a beam of light towards said surface;
second means for controlling said surface to deflect said beam;
a first lens for reducing the linear deflection provided by said second means to said beam and for focusing said beam to a diffraction limited spot; and
a second lens positioned where said first lens reduces said deflection substantially to zero for focusing said diffraction limited spot to a diminished size.

2. Light deflecting apparatus according to claim 1 in which said second lens is positioned where said first lens reduces said deflection to zero.

3. Light deflecting apparatus according to claim 1 in which said first means directs a highly collimated beam of light towards said light reflective surface and in which said second means rotates said surface to deflect said beam.

4. Light deflecting apparatus according to claim 3 in which the focal length of said second lens is substantially smaller than the focal length of said first lens, for focusing said diffraction limited spot to a diminished size suitable for high resolution micro-scanning.

5. Light deflecting apparatus according to claim 4 in which said first lens and said second lens are so arranged that their optical axes coincide with one another.

6. Light deflecting apparatus according to claim 5 in which said first means directs a laser beam of light of 6,328 A. wavelength and .1 inch diameter towards a light reflective plane mirror and in which said first and second lenses are a 1.79 inch focal length, F1.5 16 mm. camera lens and 8 mm. focal length, .5 numerical aperture microscope objective, respectively.

7. Light deflecting apparatus comprising:
a first light reflective mirror;
means for directing a beam of light towards said mirror;
first means for rotating said mirror in a first plane to deflect said beam in said plane;
a first lens for reducing the linear deflection provided by said first rotating means to said beam and for focusing said beam to a first diffraction limited spot;
a second light reflective mirror positioned where said first lens reduces said linear deflection to zero;
second means for rotating said second mirror in a plane perpendicular to that of said first plane, to deflect the beam of light passing through said first lens in said perpendicular plane;
a second lens for reducing the linear deflection provided by said second rotating means to said passing beam and for focusing said beam to a second diffraction limited spot; and
a third lens of substantially smaller focal length than that of said first and second lenses, positioned where said second lens reduces said linear deflection in said perpendicular plane to zero, for focusing said second diffraction limited spot to a diminished size suitable for high resolution scanning of a micro-image.

8. Light deflecting apparatus according to claim 7 in which the optical axes of said first and said second lenses are so arranged with respect to their associated mirrors that the deflection centers of said mirrors are superimposed one upon the other at said third lens.

References Cited

UNITED STATES PATENTS

| | | | |
|---|---|---|---|
| 1,979,296 | 11/1934 | Sweeney | 350—6 X |
| 2,068,829 | 1/1937 | Albada | 350—8 X |
| 2,881,657 | 4/1959 | Wittel. | |
| 2,977,847 | 4/1961 | Meyer-Arendt | 350—8 |
| 3,062,965 | 11/1962 | Sick | 350—7 |
| 3,153,723 | 10/1964 | Weiss | 350—7 |
| 3,163,754 | 12/1964 | Bigelow. | |
| 3,180,216 | 4/1965 | Osterberg | 331—94.5 X |
| 3,311,843 | 3/1967 | Friedl | 331—94.5 |
| 3,324,478 | 6/1967 | Jacobs | 331—94.5 |
| 3,107,296 | 10/1963 | Hine | 350—96 |
| 3,192,824 | 7/1965 | Rosenthal | 350—7 |
| 3,281,712 | 10/1966 | Koester | 33—94.5 |
| 3,345,120 | 10/1967 | Palmer | 350—6 |

FOREIGN PATENTS 1,306,777  9/1962  France.

DAVID SCHONBERG, *Primary Examiner.*

PAUL R. GILLIAM, *Assistant Examiner.*

U.S. Cl. X.R.

350—45, 55